(12) United States Patent
Birkett et al.

(10) Patent No.: US 11,274,190 B2
(45) Date of Patent: Mar. 15, 2022

(54) CURE ACCELERATORS FOR ANAEROBIC CURABLE COMPOSITIONS

(71) Applicant: Henkel IP & Holding GmbH, Duesseldorf (DE)

(72) Inventors: David Birkett, Naas (IE); Pat O'Dwyer, Dublin (IE); David Condron, Dublin (IE); Hilary Mongey, Dublin (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/844,279

(22) Filed: Apr. 9, 2020

(65) Prior Publication Data
US 2020/0299485 A1    Sep. 24, 2020

Related U.S. Application Data

(63) Continuation of application No. PCT/EP2018/077044, filed on Oct. 4, 2018.

(30) Foreign Application Priority Data

Oct. 9, 2017 (GB) ..................... 1716517

(51) Int. Cl.
C08K 5/3437 (2006.01)
C08F 20/06 (2006.01)
(Continued)

(52) U.S. Cl.
CPC ............ *C08K 5/3437* (2013.01); *C08F 20/06* (2013.01); *C08K 5/005* (2013.01); *C08K 5/0025* (2013.01); *C08K 5/14* (2013.01)

(58) Field of Classification Search
None
See application file for complete search history.

(56) References Cited

U.S. PATENT DOCUMENTS 3,218,305 A    11/1965   Krieble
3,651,036 A     3/1972   Wantanabe et al.
(Continued)

FOREIGN PATENT DOCUMENTS

DE    1817989 A1   12/1976
DE    2806701 A1    8/1978
(Continued)

OTHER PUBLICATIONS 5-page brochure for 1,2,3,4-Tetrahydro-benzo[h]quinolin-3-ol (CAS 5423-67-6) by Santa Cruz Biotechnology, Inc., Copyrighted 2007-2021, Downloaded on Apr. 29, 2021.*
(Continued)

*Primary Examiner* — Tae H Yoon
(74) *Attorney, Agent, or Firm* — Steven C. Bauman

(57) ABSTRACT

The present invention relates to cure accelerators useful for anaerobic curable compositions, such as adhesives and sealants. The cure accelerators are embraced within

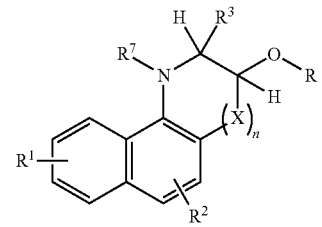

where X is $CH_2$, O, S, $NR^4$, $CR^5R^6$ or C=O, wherein $R^4$, $R^5$, and $R^6$ are each individually selected from hydrogen, halogen, amino, carboxyl, nitro, alkyl, alkenyl, alkynyl, hydroxyalkyl, hydroxyalkenyl, hydroxyalkynyl, or alkaryl; R is one or more of hydrogen, alkyl, alkenyl, alkynl,
(Continued)

hydroxyalkyl, hydroxyalkenyl, or hydroxyalkynl; $R^1$, $R^2$, and $R^3$ are each individually selected from hydrogen, halogen, amino, carboxyl, nitro, alkyl, alkenyl, alkynyl, hydroxyalkyl, hydroxyalkenyl, hydroxyalkynyl, or alkaryl; $R^7$ is hydrogen or $CHR^8R^9$, where $R^8$ and $R^9$ are each individually selected from hydrogen, halogen, amino, carboxyl, nitro, alkyl, alkenyl, alkynyl, hydroxyalkyl, hydroxyalkenyl, hydroxyalkynyl, or alkaryl; and n is 0 or 1. A particularly desirable example is 1,2,3,4-tetrahydrobenzo-h-quinolin-3-ol.

10 Claims, 8 Drawing Sheets

(51) Int. Cl.
*C08K 5/00* (2006.01)
*C08K 5/14* (2006.01)

(56) References Cited

U.S. PATENT DOCUMENTS

| | | |
|---|---|---|
| 3,933,748 A | 1/1976 | Matsuda et al. |
| 3,970,505 A | 7/1976 | Hauser et al. |
| 4,287,350 A | 9/1981 | Huellstrung et al. |
| 4,321,349 A | 3/1982 | Rich |
| 5,411,988 A | 5/1995 | Bockow et al. |
| 5,605,999 A | 2/1997 | Chu et al. |
| 5,811,473 A | 9/1998 | Ramos et al. |
| 6,001,517 A | 12/1999 | Kawamonzen |
| 6,391,993 B1 | 5/2002 | Attarwala et al. |
| 6,583,289 B1 | 6/2003 | McArdle et al. |
| 6,835,762 B1 | 12/2004 | Kelmarczyk et al. |
| 6,852,778 B1 | 2/2005 | Kusuyama |
| 6,897,277 B1 | 5/2005 | Klemarczyk et al. |
| 6,958,368 B1 | 10/2005 | Klemarczyk et al. |
| 8,362,112 B2 | 1/2013 | Birkett et al. |
| 8,481,659 B2 | 7/2013 | Birkett et al. |

FOREIGN PATENT DOCUMENTS

| | | | |
|---|---|---|---|
| FR | 1581361 | | 9/1969 |
| GB | 1097600 | | 1/1968 |
| GB | 1347068 | * | 2/1974 |
| JP | 54-69198 A | | 6/1979 |
| JP | 07-308757 A | | 11/1995 |
| JP | 2012211697 A | | 11/2012 |
| WO | 0040664 A1 | | 7/2000 |
| WO | 2010127053 A2 | | 11/2010 |
| WO | 2014151358 A2 | | 9/2014 |

OTHER PUBLICATIONS

Rich, Richard D. "Anaerobic Adhesives," Handbook of Adhesive Technology, ed. Pizza, A and Mittal, K.L., Marcel Dekker, Inc., Chapter 2, 1994, pp. 467-479.

International Search Report issued in connection with International Patent Application No. PCT/EP2018/077044 dated Dec. 2, 2019.

* cited by examiner

CURE ACCELERATORS FOR ANAEROBIC CURABLE COMPOSITIONS

BACKGROUND

Field

The present invention relates to cure accelerators useful for anaerobic curable compositions, such as adhesives and sealants. The cure accelerators are embraced within the structure below

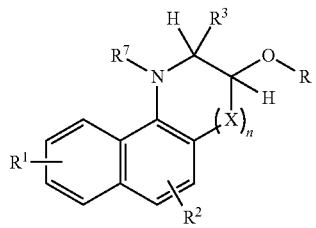

where X is $CH_2$, O, S, $NR^4$, $CR^5R^6$ or C=O, wherein $R^4$, $R^5$, and $R^6$ are each individually selected from hydrogen, halogen, amino, carboxyl, nitro, alkyl, alkenyl, alkynyl, hydroxyalkyl, hydroxyalkenyl, hydroxyalkynyl, or alkaryl; R is one or more of hydrogen, alkyl, alkenyl, alkynl, hydroxyalkyl, hydroxyalkenyl, or hydroxyalkynl; $R^1$, $R^2$, and $R^3$ are each individually selected from hydrogen, halogen, amino, carboxyl, nitro, alkyl, alkenyl, alkynyl, hydroxyalkyl, hydroxyalkenyl, hydroxyalkynyl, or alkaryl; $R^7$ is hydrogen or $CHR^8R^9$, where $R^8$ and $R^9$ are each individually selected from hydrogen, halogen, amino, carboxyl, nitro, alkyl, alkenyl, alkynyl, hydroxyalkyl, hydroxyalkenyl, hydroxyalkynyl, or alkaryl; and n is 0 or 1. A particularly desirable example is 1,2,3,4-tetrahydrobenzo-h-quinolin-3-ol.

Brief Description of Related Technology

Anaerobic adhesive compositions generally are well-known. See e.g. R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxyl initiator and an inhibitor component. Often, such anaerobic adhesive compositions also contain accelerator components to increase the speed with which the composition cures.

Desirable anaerobic cure-inducing compositions to induce and accelerate cure may ordinarily include one or more of saccharin, toluidines, such as N,N-diethyl-p-toluidine ("DE-p-T") and N,N-dimethyl-o-toluidine ("DM-o-T"), acetyl phenylhydrazine ("APH"), maleic acid.

Saccharin and APH are used as standard cure accelerator components in anaerobic adhesive cure systems. These components however have come under regulatory scrutiny in certain parts of the world, and thus efforts have been undertaken to identify candidates as replacements.

Examples of other curatives for anaerobic adhesives include thiocaprolactam (e.g., U.S. Pat. No. 5,411,988) and thioureas [e.g., U.S. Pat. No. 3,970,505 (Hauser) (tetramethyl thiourea), German Patent Document Nos. DE 1 817 989 (alkyl thioureas and N,N'-dicyclohexyl thiourea) and 2 806 701 (ethylene thiourea), and Japanese Patent Document No. JP 07-308,757 (acyl, alkyl, alkylidene, alkylene and alkyl thioureas)], certain of the latter of which had been used commercially up until about twenty years ago.

Loctite (R&D) Ltd. discovered a new class of materials—trithiadiaza pentalenes—effective as curatives for anaerobic adhesive compositions. The addition of these materials into anaerobic adhesives as a replacement for conventional curatives (such as APH) surprisingly provides at least comparable cure speeds and physical properties for the reaction products formed therefrom. See U.S. Pat. No. 6,583,289 (McArdle).

U.S. Pat. No. 6,835,762 (Klemarczyk) provides an anaerobic curable composition based on a (meth)acrylate component with an anaerobic cure-inducing composition substantially free of acetyl phenylhydrazine and maleic acid and an anaerobic cure accelerator compound having the linkage —C(=O)—NH—NH— and an organic acid group on the same molecule, provided the anaerobic cure accelerator compound excludes 1-(2-carboxyacryloyl)-2-phenylhydrazine. The anaerobic cure accelerator is embraced by:

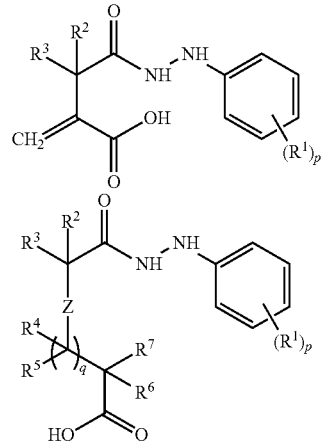

where $R^1$-$R^7$ are each independently selected from hydrogen and $C_{1-4}$; Z is a carbon-carbon single bond or carbon-carbon double bond; q is 0 or 1; and p is an integer between 1 and 5, examples of which are 3-carboxyacryloyl phenylhydrazine, methyl-3-carboxyacryloyl phenylhydrazine, 3-carboxypropanoyl phenylhydrazine, and methylene-3-carboxypropanoyl phenylhydrazine.

U.S. Pat. No. 6,897,277 (Klemarczyk) provides an anaerobic curable composition based on a (meth)acrylate component with an anaerobic cure-inducing composition substantially free of saccharin and an anaerobic cure accelerator compound within the following structure

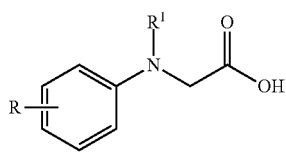

where R is selected from hydrogen, halogen, alkyl, alkenyl, hydroxyalkyl, hydroxyalkenyl, carboxyl, and sulfonate, and $R^1$ is selected from hydrogen, alkyl, alkenyl, hydroxyalkyl, hydroxyalkenyl, and alkaryl, an example of which is phenyl glycine and N-methyl phenyl glycine.

U.S. Pat. No. 6,958,368 (Messana) provides an anaerobic curable composition. This composition is based on a (meth) acrylate component with an anaerobic cure-inducing composition substantially free of saccharin and within the following structure

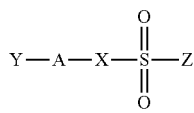

where Y is an aromatic ring, optionally substituted at up to five positions by $C_{1-6}$ alkyl or alkoxy, or halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded from the structure. Examples of the anaerobic cure accelerator compound embraced by the structure above include 2-sulfobenzoic acid cyclic anhydride, and 3H-1,2-benzodithiol-3-one-1,1-dioxide.

Three Bond Co. Ltd., Tokyo, Japan has in the past described as a component in anaerobic adhesive and sealant compositions a component called tetrahydroquinoline ("THQ").

And more recently U.S. Pat. No. 8,362,112 describes a reaction product prepared from reactants comprising: (a) a compound embraced within

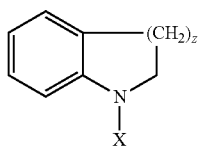

where X is $C_{1-20}$ alkyl, $C_{2-20}$ alkenyl, or $C_{7-20}$ alkaryl, any of which may be interrupted by one or more hereto atoms, and which are functionalized by at least one group selected from —OH, —NH$_2$—SH and z is 1-3 and (b) at least one isocyanate functional material.

U.S. Pat. No. 8,481,659 describes an anaerobic curable composition comprising (a) a (meth)acrylate component; (b) an anaerobic cure system; and (c) a reaction product prepared from reactants comprising: (i) at least one compound selected from the group of compounds represented by

where z is 1-3; and (b) either: (i) at least one compound selected from the group of compounds represented by where Z" is selected from —O—, —S—, and —NH—; q is 1 to 4; $R^6$ is independently selected from the group consisting of hydroxyalkyl, aminoalkyl, and thioalkyl; and n is at least 1, where the reaction product comprises at least two pendant functional groups independently selected from —OH, —NH$_2$ and —SH; or (ii) an alkylating agent, alkenylating agent or alkarylating agent.

Notwithstanding the state of the art, there is an on-going desire to find alternative technologies for anaerobic cure accelerators to differentiate existing products and provide supply assurances in the event of shortages or cessation of supply of raw materials. Moreover, since certain of the raw materials used in conventional anaerobic cure inducing compositions have to one degree or another come under regulatory scrutiny and may be affected by supply chain interruptions, alternative components for anaerobic cure inducing compositions would be desirable. Accordingly, it would be desirable to identify new materials that function as cure components in the cure of anaerobically curable compositions.

SUMMARY

The present invention relates to cure accelerators useful for anaerobic curable compositions, such as adhesives and sealants.

The cure accelerators are embraced within the structure below

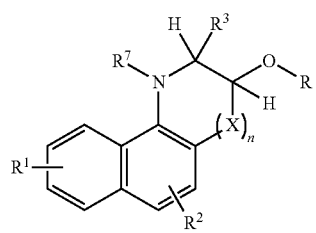

where X is CH$_2$, O, S, NR$^4$, CR$^5$R$^6$ or C=O, wherein R$^4$, R$^5$, and R$^6$ are each individually selected from hydrogen, halogen, amino, carboxyl, nitro, alkyl, alkenyl, alkynyl, hydroxyalkyl, hydroxyalkenyl, hydroxyalkynyl, or alkaryl; R is one or more of hydrogen, alkyl, alkenyl, alkynl, hydroxyalkyl, hydroxyalkenyl, or hydroxyalkynl; R$^1$, R$^2$, and R$^3$ are each individually selected from hydrogen, halogen, amino, carboxyl, nitro, alkyl, alkenyl, alkynyl, hydroxyalkyl, hydroxyalkenyl, hydroxyalkynyl, or alkaryl; R$^7$ is hydrogen or CHR$^8$R$^9$, where R$^8$ and R$^9$ are each individually selected from hydrogen, halogen, amino, carboxyl, nitro, alkyl, alkenyl, alkynyl, hydroxyalkyl, hydroxyalkenyl, hydroxyalkynyl, or alkaryl; and n is 0 or 1. Each of the carboxyl, alkyl, alkenyl, alkynyl, hydroxyalkyl, hydroxyalkenyl, hydroxyalkynyl, or alkaryl should contain as appropriate one to twelve carbon atoms. A particularly desirable example is 1,2,3,4-tetrahydrobenzo-h-quinolin-3-ol.

These cure accelerators are useful in anaerobic curable compositions that comprise a (meth)acrylate component and an anaerobic cure-inducing component.

DETAILED DESCRIPTION

Figure 1:
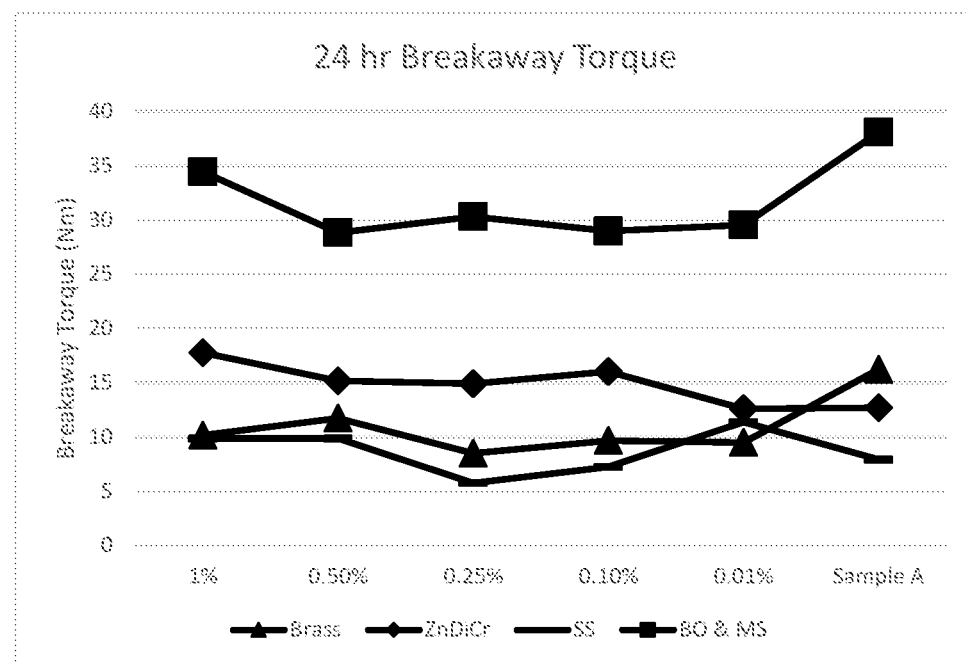
FIG. 1 depicts a plot of 24 hour breakaway torque of anaerobic adhesive compositions as a control (that contains 0.9% by weight THQ as an accelerator and a comparable one without THQ but with THBQol as an inventive cure accelerator at various concentrations, on M10 nuts and bolts constructed from brass, zinc dichromate, stainless and mild steel/black oxide.
Figure 2:
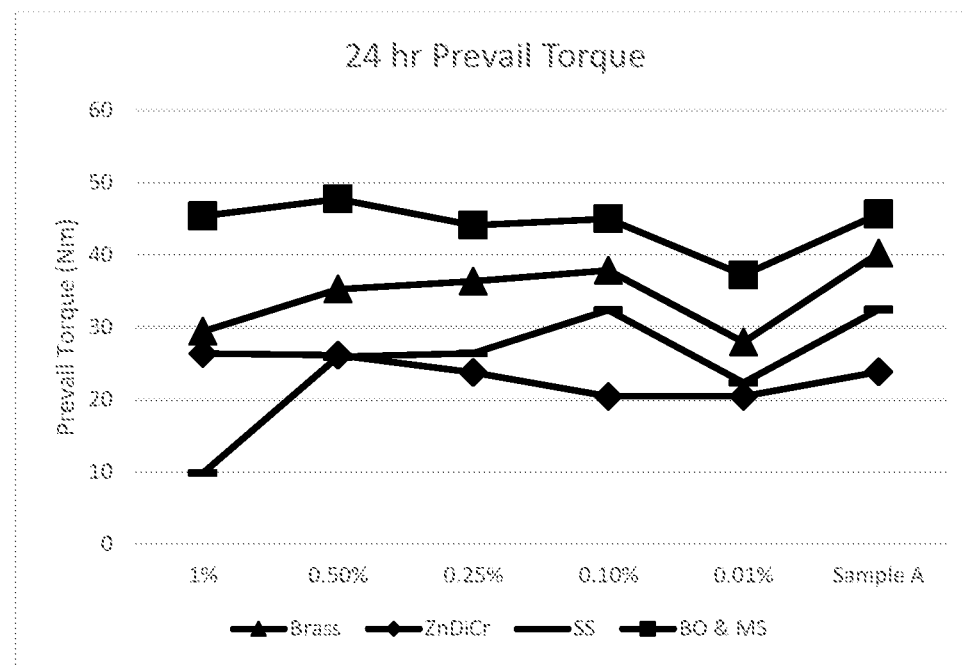
FIG. 2 depicts a plot of 24 hour prevail torque of anaerobic adhesive compositions as a control (that contains 0.9% weight THQ as an accelerator) and a comparable one without THQ but with THBQol as an inventive cure accelerator at various concentrations, on M10 nuts and bolts constructed from brass, zinc dichromate, stainless and mild steel/black oxide.
Figure 3:
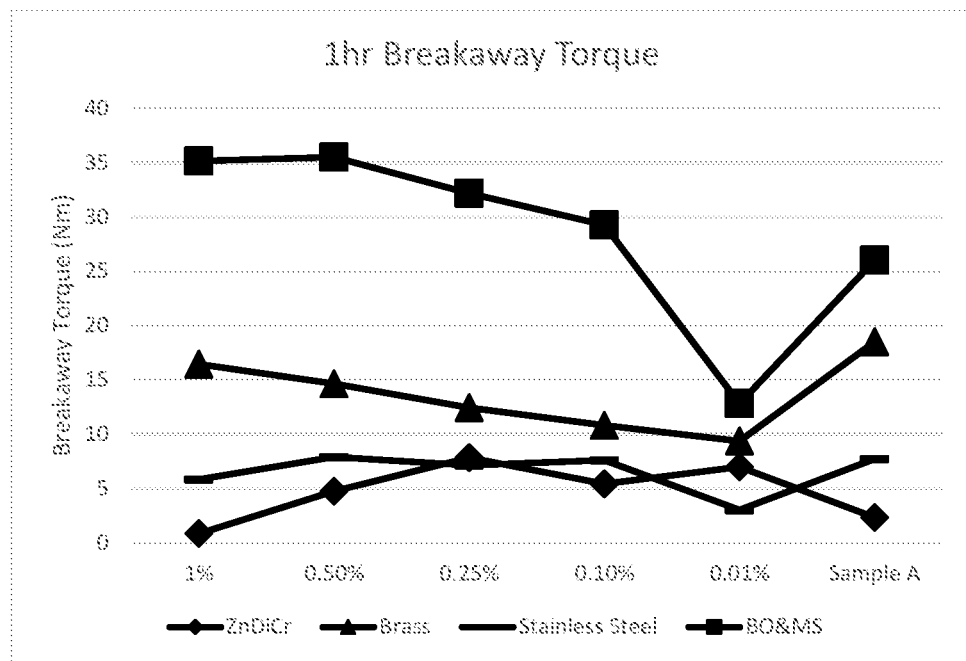
FIG. 3 depicts a plot of 1 hour breakaway torque of anaerobic adhesive compositions as a control (that contains 0.9% by weight THQ as an accelerator) and a comparable one without THQ but with THBQol as an inventive cure accelerator at various concentrations, on M10 nuts and bolts constructed from brass, zinc dichromate, stainless and mild steel/black oxide.
Figure 4:
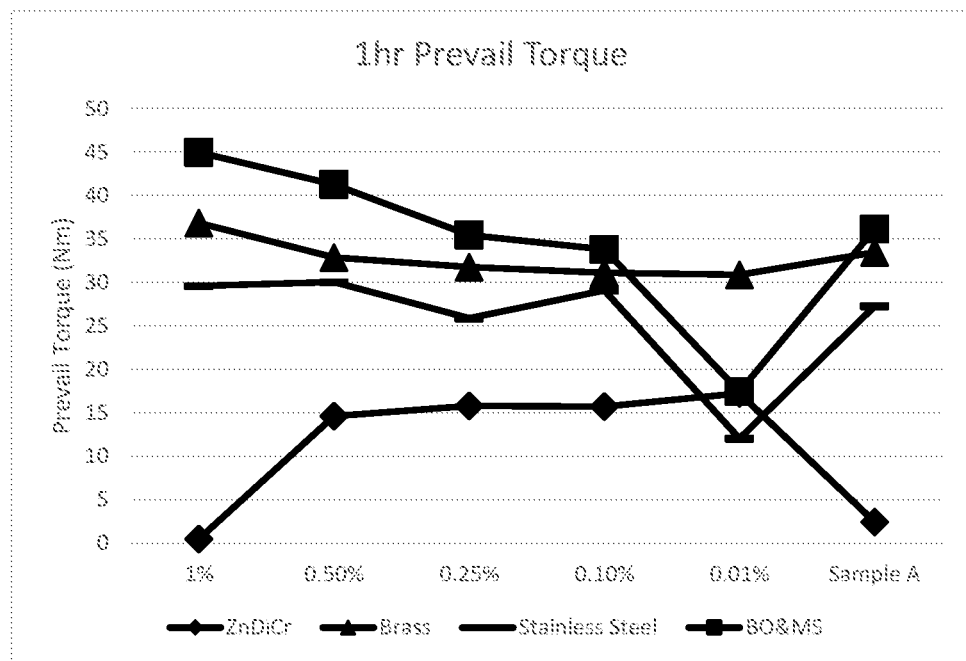
FIG. 4 depicts a plot of 1 hour prevail torque of anaerobic adhesive compositions as a control (that contains 0.9% by weight THQ as an accelerator) and a comparable one without THQ but with THBQol as an inventive cure accelerator at various concentrations, on M10 nuts and bolts constructed from brass, zinc dichromate, stainless and mild steel/black oxide.
Figure 5:
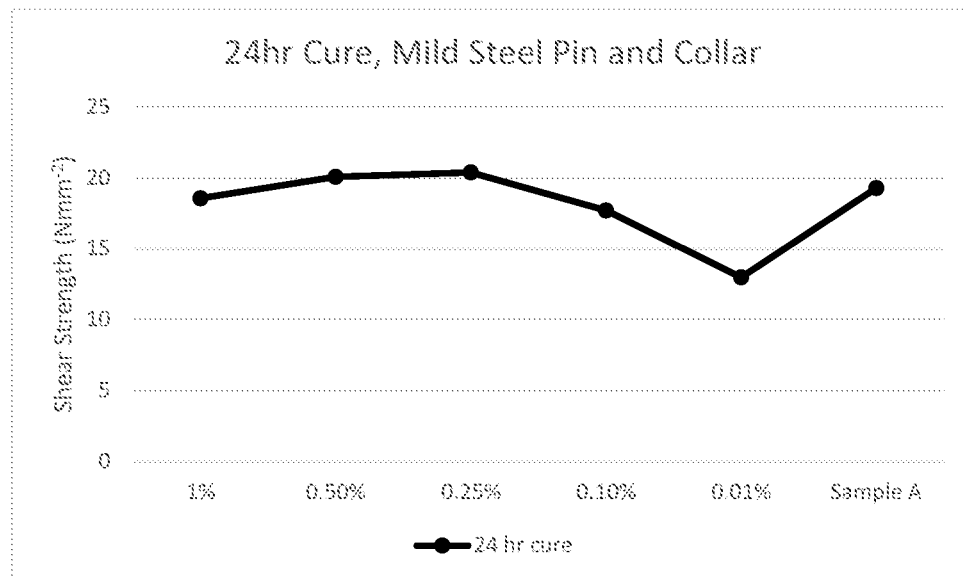
FIG. 5 depicts a plot of 24 hour shear strength of anaerobic adhesive compositions as a control (that contains 0.9% by weight THQ as an accelerator) and a comparable one without THQ but with THBQol as an inventive cure accelerator at various concentrations, on pin and collars constructed from mild steel.
Figure 6:
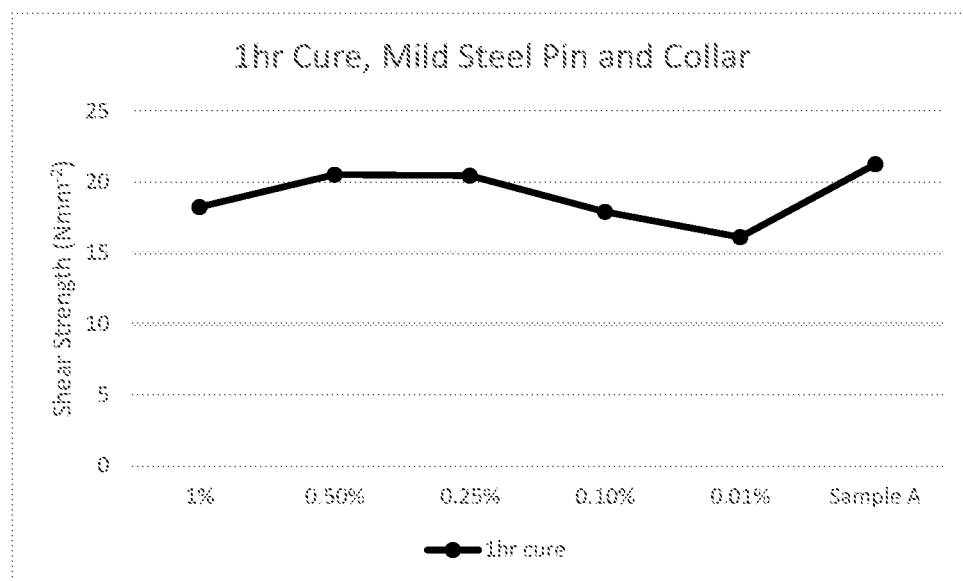
FIG. 6 depicts a plot of 1 hour shear strength of anaerobic adhesive compositions as a control (that contains 0.9% by weight THQ as an accelerator) and a comparable one without THQ but with THBQol as an inventive cure accelerator at various concentrations, on pin and collars constructed from mild steel.

The present invention relates to the addition of cure accelerators into anaerobic adhesives as a replacement for some or all of the amount of conventional anaerobic cure accelerators [such as toluidines, THQ and/or acetyl phenylhydrazine ("APH")] surprisingly provides at least comparable cure speeds and physical properties for the reaction products formed therefrom, as compared with those observed from conventional anaerobic curable compositions.

For instance, through the use of the inventive cure accelerator reduced levels of THQ and/or APH (such as about 50% or less by weight of that which is used in conventional anaerobic curable compositions), may be achieved and desirably the anaerobic curable compositions are substantially free of THQ and/or APH (less than about 10 weight percent, less than about 5 weight percent or less than about 1 weight percent) or is free of THQ and/or APH. In place of some or all of THQ and/or APH is the cure accelerator of the present invention.

(Meth)acrylate monomers suitable for use as the (meth)acrylate component in the present invention may be selected from a wide variety of materials, such as those represented by $H_2C=CGCO_2R^8$, where G may be hydrogen, halogen or alkyl groups having from 1 to about 4 carbon atoms, and $R^8$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein as the (meth)acrylate component in the present invention or as a component in making the reaction product include polyfunctional (meth)acrylate monomers, for example di-or tri-functional (meth)acrylates such as polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylates ("TMPTMA"), diethylene glycol dimethacrylate, triethylene glycol dimethacrylates ("TRIEGMA"), tetraethylene glycol di(meth)acrylates, dipropylene glycol di(meth)acrylates, di-(pentamethylene glycol) di(meth)acrylates, tetraethylene diglycol di(meth)acrylates, diglycerol tetra(meth)acrylates, tetramethylene di(meth)acrylates, ethylene di(meth)acrylates, neopentyl glycol di(meth)acrylates, and bisphenol-A mono and di(meth)acrylates, such as ethoxylated bisphenol-A (meth)acrylate ("EBIPMA"), and bisphenol-F mono and di(meth)acrylates, such as ethoxylated bisphenol-A (meth)acrylate.

Still other (meth)acrylate monomers that may be used herein include silicone (meth)acrylate moieties ("SiMA"), such as those taught by and claimed in U.S. Pat. No. 5,605,999 (Chu), incorporated herein by reference.

Other suitable monomers include polyacrylate esters represented by the formula

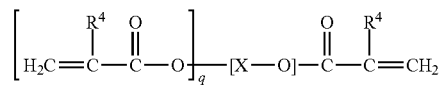

where $R^4$ is a radical selected from hydrogen, halogen or alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, preferably 30, and most preferably about 20.

For example, X can be an organic radical of the formula:

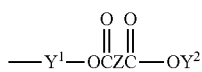

wherein each of $Y^1$ and $Y^2$ is an organic radical, preferably a hydrocarbon group, containing at least 2 carbon atoms, and preferably from 2 to about 10 carbon atoms, and Z is an organic radical, preferably a hydrocarbon group, containing at least 1 carbon atom, and preferably from 2 to about 10 carbon atoms.

Other classes of useful monomers are the reaction products of di- or tri-alkylolamines (e.g., ethanolamines or propanolamines) with acrylic acids, such as are disclosed in French Patent No. 1,581,361.

Examples of useful acrylate ester oligomers include those having the following general formula:

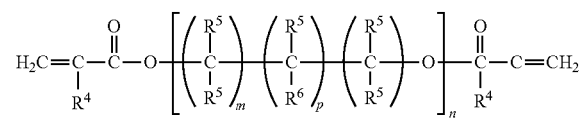

where $R^5$ represents a radical selected from hydrogen, lower alkyl of from 1 to about 4 carbon atoms, hydroxy alkyl of from 1 to about 4 carbon atoms, and

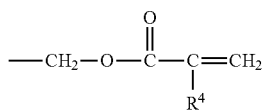

where $R^4$ is a radical selected from hydrogen, halogen, or lower alkyl of from 1 to about 4 carbon atoms; $R^6$ is a radical selected from hydrogen, hydroxyl, or

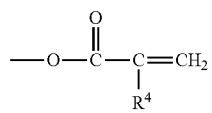

m is an integer equal to at least 1, e.g., from 1 to about 15 or higher, and preferably from 1 to about 8; n is an integer equal to at least 1, e.g., 1 to about 40 or more, and preferably between about 2 and about 10; and p is 0 or 1.

Typical examples of acrylate ester oligomers corresponding to the above general formula include di-, tri- and tetraethyleneglycol dimethacrylate; di(pentamethyleneglycol)dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Desirably, the polar group is selected from labile hydrogen, heterocyclic ring, hydroxy, amino, cyano, and halo polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of monomers is prepared by the reaction of a monofunctionally substituted alkyl or aryl acrylate ester containing an active hydrogen atom on the functional substituent. This monofunctional, acrylate-terminated material is reacted with an organic polyisocyanate in suitable proportions so as to convert all of the isocyanate groups to urethane or ureido groups. The monofunctional alkyl and aryl acrylate esters are preferably the acrylates and methacrylates containing hydroxy or amino functional groups on the non-acrylate portion thereof. Acrylate esters suitable for use have the formula

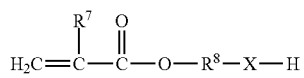

where X is selected from —O— or

and $R^9$ is selected from hydrogen or lower alkyl of 1 through 7 carbon atoms; $R^7$ is selected from hydrogen, chlorine or methyl and ethyl radicals; and $R^8$ is a divalent organic radical selected from lower alkylene of 1 through 8 carbon atoms, phenylene or naphthylene. These groups upon proper reaction with a polyisocyanate, yield a monomer of the following general formula:

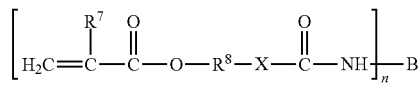

where n is an integer from 2 to about 6; B is a polyvalent organic radical selected from alkyl, alkenyl, cycloalkyl, cycloalkenyl, aryl, aralkyl, alkaryl or heterocyclic radicals both substituted and unsubstituted; and $R^7$, $R^8$ and X have the meanings given above.

Examples of suitable hydroxyl-functional (meth)acrylate include hydroxyethyl acrylate, hydroxypropyl acrylate, hydroxybutyl acrylate, hydroxyethyl methacrylate ("HEMA"), hydroxypropyl methacrylate ("HPMA"), hydroxybutyl methacrylate and mixtures thereof. Other examples of suitable hydroxy functional (meth)acrylates include 2-hydroxyethyl acrylate, 2-hydroxypropyl acrylate, 2-hydroxyethyl methacrylate ("HEMA"), pentaerythritol triacrylate ("PETA"), and 4-hydroxybutyl acrylate.

The hydroxy-functional (meth)acrylate can have a number average molecular weight of about 80 to about 1,000 grams/mole, or about 100 to about 800 grams/mole, or about 110 to about 600 grams/mole.

Of course, combinations of these (meth)acrylate monomers may also be used.

The (meth)acrylate component can comprise from about 10 to about 90 percent by weight of the composition, such as about 60 to about 90 percent by weight, based on the total weight of the composition.

The anaerobic cure-inducing composition comprises a hydroperoxide selected from t-butyl hydroperoxide, p-methane hydroperoxide, cumene hydroperoxide, diisopropylbenzene hydroperoxide, and mixtures thereof.

As noted above, cure accelerators are provided embraced within the structure below

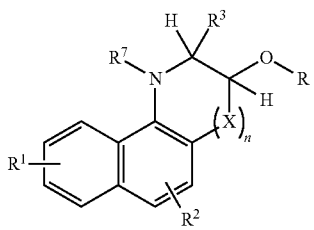

where X is $CH_2$, O, S, $NR^4$, $CR^5R^6$ or C=O, wherein $R^4$, $R^5$, and $R^6$ are each individually selected from hydrogen, halogen, amino, carboxyl, nitro, alkyl, alkenyl, alkynyl, hydroxyalkyl, hydroxyalkenyl, hydroxyalkynyl, or alkaryl; R is one or more of hydrogen, alkyl, alkenyl, alkynl, hydroxyalkyl, hydroxyalkenyl, or hydroxyalkynl; $R^1$, $R^2$, and $R^3$ are each individually selected from hydrogen, halogen, amino, carboxyl, nitro, alkyl, alkenyl, alkynyl, hydroxyalkyl, hydroxyalkenyl, hydroxyalkynyl, or alkaryl; $R^7$ is hydrogen or $CHR^8R^9$, where $R^8$ and $R^9$ are each individually selected from hydrogen, halogen, amino, carboxyl, nitro, alkyl, alkenyl, alkynyl, hydroxyalkyl, hydroxyalkenyl, hydroxyalkynyl, or alkaryl; and n is 0 or 1. Each of the carboxyl, alkyl, alkenyl, alkynyl, hydroxyalkyl, hydroxyalkenyl, hydroxyalkynyl, or alkaryl should contain as appropriate one to twelve carbon atoms.

More specifically, one embodiment of the cure accelerator is

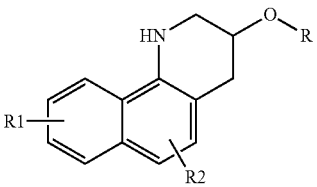

where R, $R^1$ and $R^2$ are as defined above.

And within the structures above are desirable alternative embodiments of the cure accelerator:

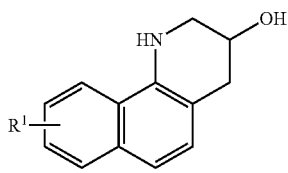

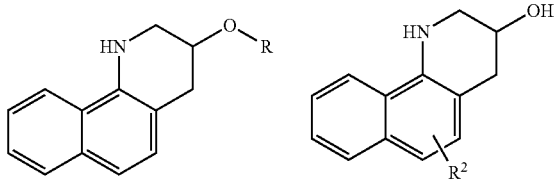

In each of these three alternative embodiments, R is as defined above.

A particularly desirable embodiment is

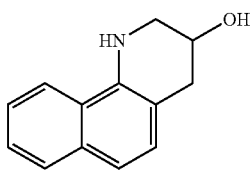 [SMILES: OC1CNc2c(ccc3ccccc23)C1]

1,2,3,4-tetrahydrobenzo-h-quinolin-3-ol

The cure accelerator may be present in amounts of about 0.005 to about 5 percent by weight, such as about 0.01 to about 2 percent by weight desirably about 0.01 to about 1.5 percent by weight, based on the total weight of the composition. The cure accelerators may be used in combination with conventional accelerators (here called co-accelerators though at lower levels than such conventional accelerators).

To the (meth)acrylate component, the anaerobic cure-inducing composition and the cure accelerator may be added components that have been included in traditional anaerobic adhesives to alter the physical properties of either the formulation or the reaction products thereof. For instance, one or more of maleimide components, thermal resistance-conferring co reactants, diluent components reactive at elevated temperature conditions, mono- or poly-hydroxyalkanes, polymeric plasticizers, and chelators (see U.S. Pat. No. 6,391,993, incorporated herein by reference) may be included to modify the physical property and/or cure profile of the formulation and/or the strength or temperature resistance of the cured adhesive.

When used, the maleimide, co-reactant, reactive diluent, plasticizer, and/or mono- or poly-hydroxyalkanes, may be present in an amount within the range of about 1 percent to about 30 percent by weight, based on the total weight of the composition.

The inventive compositions may also include other conventional components, such as free radical initiators, free radical co-accelerators, and inhibitors of free radical generation, as well as metal catalysts.

A number of well-known initiators of free radical polymerization are typically incorporated into the inventive compositions including, without limitation, peroxide compounds such as hydroperoxides, like cumene hydroperoxide ("CHP"), para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

As noted, conventional accelerators of free radical polymerization may also be used in conjunction with the cure accelerators used in the present invention, though in amounts less than that used in the past. Such accelerators (referred to herein as co-accelerators) are typically of the hydrazine variety (e.g., APH), as disclosed in U.S. Pat. No. 4,287,350 (Rich) and U.S. Pat. No. 4,321,349 (Rich). When APH is chosen as a co-accelerator for use herein, maleic acid would usually be added as well. One benefit of the present invention is that the inventive anaerobic cure accelerators render the use of such acids unnecessary in preparing anaerobic adhesive compositions.

Other co-accelerators may also be used in the compositions of the present invention including, without limitation, organic amides and imides, such as benzoic sulfimide (also known as saccharin) (see U.S. Pat. No. 4,324,349). Of course, THQ as well could be used as a co-accelerator.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelating agents may ordinarily be present in the compositions in an amount from about 0.001 percent by weight to about 0.1 percent by weight, based on the total weight of the composition.

Metal catalyst solutions or pre-mixes thereof are used in amounts of about 0.03 to about 0.1 percent by weight.

Other additives such as thickeners, non-reactive plasticizers, fillers, toughening agents (such as elastomers and rubbers) and other well-known additives may be incorporated therein where the art-skilled believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, and other metals and alloys, ceramics and thermosets. The compositions of this invention demonstrate particularly good bond strength on steel, brass, copper and zinc. An appropriate primer for anaerobic curable compositions may be applied to a surface of the chosen substrate to enhance cure rate. Or, the inventive anaerobic cure accelerators may be applied to the surface of a substrate as a primer. See e.g. U.S. Pat. No. 5,811,473 (Ramos).

In addition, the invention provides a method of preparing an anaerobic curable composition, a step of which includes mixing together a (meth)acrylate component, an anaerobic cure inducing composition, and an anaerobic cure accelerator reaction product.

And the present invention provides a method of using an anaerobic cure accelerator compound, including (I) mixing the anaerobic cure accelerator compound in an anaerobic curable composition or (II) applying onto a surface of a substrate the anaerobic cure accelerator compound and applying thereover an anaerobic curable composition. Of course, the present invention also provides a bond formed between mated substrates with the inventive composition.

In view of the above description of the present invention, it is clear that a wide range of practical opportunities are provided. The following examples are for illustrative purposes only, and are not to be construed so as to limit in any way the teaching herein.

EXAMPLES

The noted components in the amounts indicated in Table 1 below were used to formulate Samples B and D. As controls, Samples A and C, respectively, were used.

TABLE 1

| | Sample/Amt (wt %) | | | |
| --- | --- | --- | --- | --- |
| Component | A | B | C | D |
| PEG 200 Dimethacrylate | 68.7 | 68.7 | 65.10 | 55.10 |
| Stabilizer | 0.015 | 0.015 | 0.40 | 0.40 |
| Chelator | 0.6 | 0.6 | 2.50 | 2.50 |
| Organic Filler | 26.5 | 26.5 | 20.00 | 20.00 |
| Saccharin | 1.0 | 1.00 | 1.00 | 1.00 |
| Accelerator/THQ | 0.9 | — | 1.00 | — |
| Accelerator/THBQol | — | 0.9 | — | 1.00 |
| Initiator | 0.9 | 0.9 | 0.9 | 0.9 |

In preparing the samples, the components were mixed using a stainless steel propeller-type mixer.

These samples were evaluated for a variety of strength measurements, including breakaway torque, prevail torque and shear strength, on a variety of substrates.

Breakaway torque is the initial torque required to decrease or eliminate the axial load in a non-seated assembly. Prevailing torque, after initial breakage of the bond, is measured at any point during 360° rotation of the nut. Prevailing torque is normally determined at 180° rotation of the nut.

Black oxide bolts and mild steel were degreased, adhesive was applied to the bolt, and the nut was screwed onto the bolt. Five nut and bolt specimens were assembled for each adhesive formulation tested. For the breakaway/prevail evaluation, the specimens were maintained at ambient temperature for 1 hour and 24 hours after assembly. The breakaway and prevail torque strengths (N-m) were then recorded for five specimens of each adhesive formulation after 1 hour and after 24 hours at ambient temperature (25° C.) and 45-50% relative humidity, respectively. The torque strengths were measured using a calibrated automatic torque analyzer. The data for the breakaway torque evaluations is set forth in Tables 2A and 2B below.

TABLE 2A

|  | Time (hours) | |
| --- | --- | --- |
| Sample | 1 | 24 Breakaway Torque (N-m) |
| A | 26 | 38 |
| B | 35 | 34 |

TABLE 2B

|  | Time (hours) | |
| --- | --- | --- |
| Sample | 0.5 | 24 Breakaway Torque (N-m) |
| C | 14 | 24 |
| D | 17 | 32 |

This data captured in Tables 2A and 2B indicates that Samples B and D exhibited generally similar breakloose properties at room temperature compared to the controls (Samples A and C) when applied and cured on the substrates.

In Table 3 below, additional data was developed and recorded for Samples A and B.

TABLE 3

|  | Sample | |
| --- | --- | --- |
| Physical Property | A | B |
| Shear Strength/Steel Pin and Collar, 1 hour | 21 | 18 |
| Shear Strength/Steel Pin and Collar, 24 hours | 19 | 19 |
| Breakaway Torque/M10 Black Oxide bolts and Mild Steel nuts, 1 hour | 26 | 35 |
| Prevail Torque/M10 Black Oxide bolts and Mild Steel nuts, 1 hour | 36 | 45 |
| Breakaway Torque/M10 Black Oxide bolts and Mild Steel nuts, 24 hours | 38 | 34 |
| Prevail Torque/M10 Black Oxide bolts and Mild Steel nuts, 24 hours | 45 | 45 |

Figure 11:
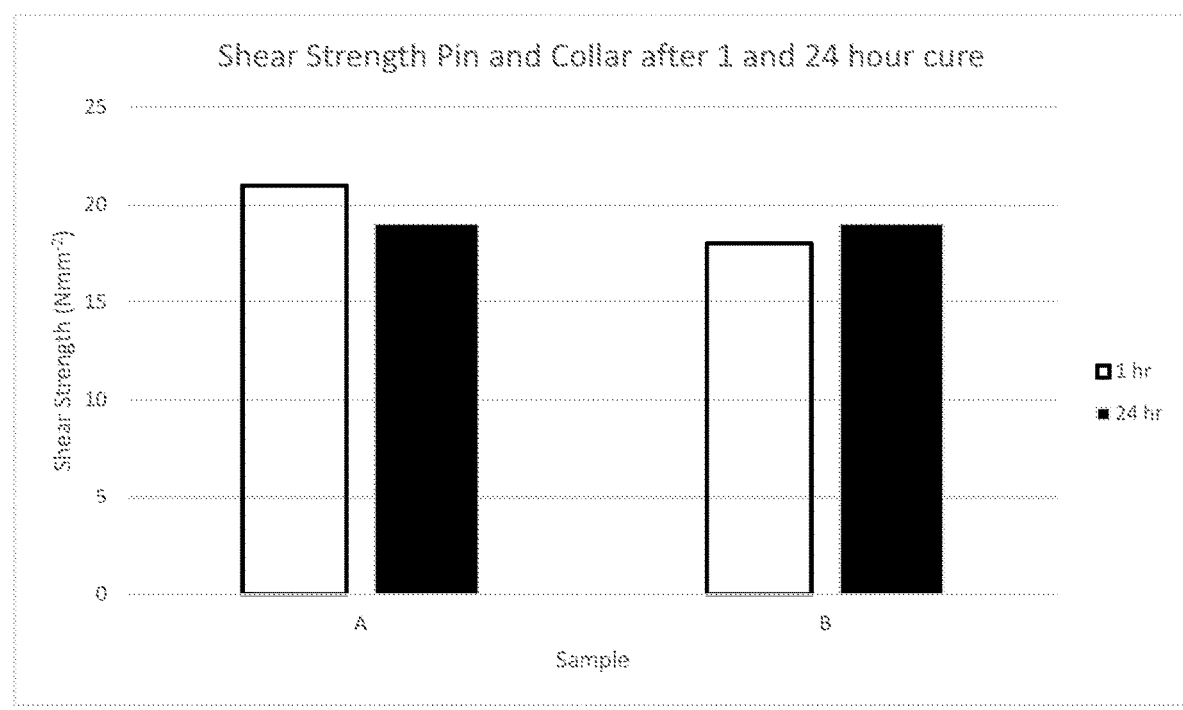
FIG. 11 depicts a bar chart of shear strength values on pin and collar assemblies for Samples A and B after 1 and 24 hour cure.
Figure 12:
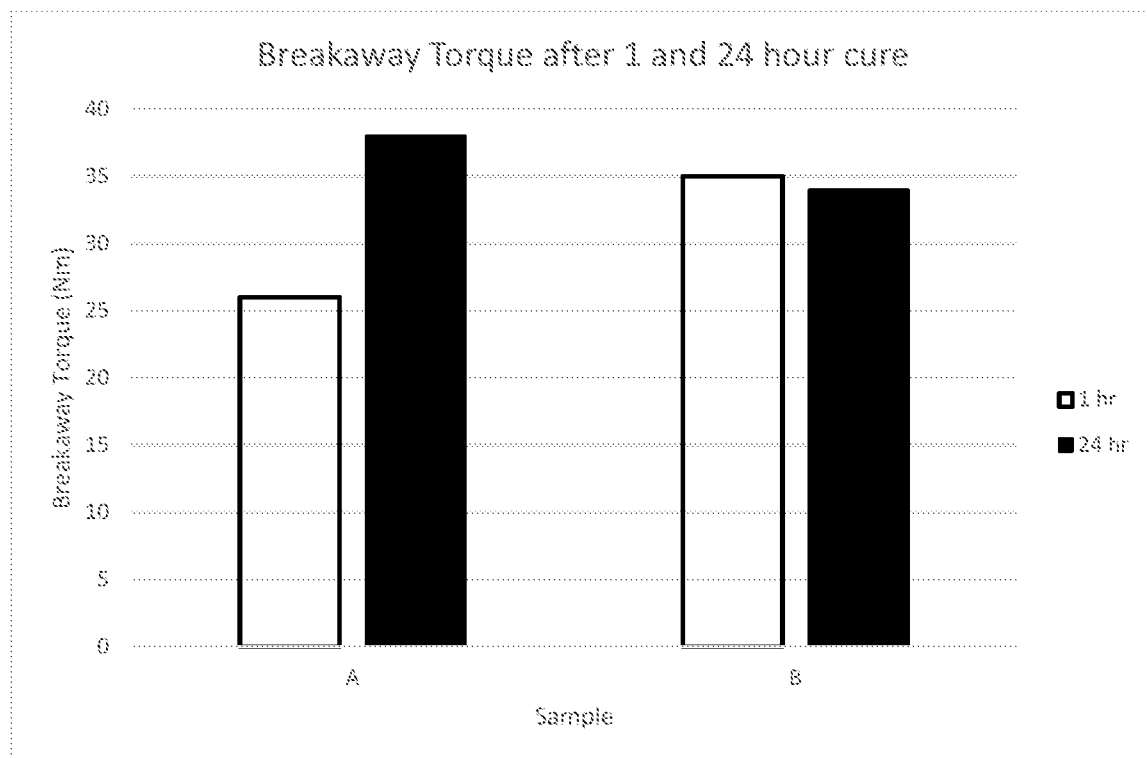
FIG. 12 depicts a bar chart of breakaway torque values for Samples A and B after 1 and 24 hour cure.
Figure 13:
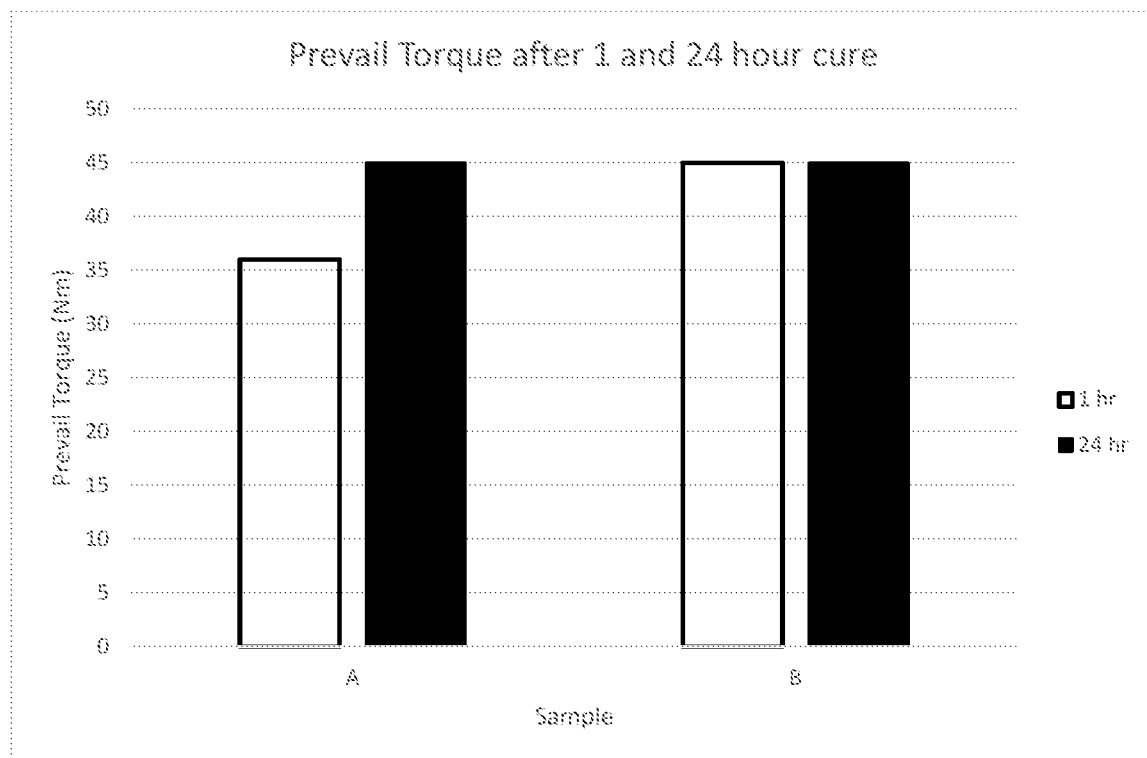
FIG. 13 depicts a bar chart of prevail torque values for Samples A and B after 1 and 24 hour cure.

Sample B (with THBQol) performed in most cases at least as well as the control, Sample A. See FIGS. 11-13 for a graphical depiction of these data.

Reference to FIGS. 1-6 show some of the data captured in Table 3 and also data from additional samples using THBQol in five different amounts (and none) as set forth below in Table 4.

TABLE 4

| THBQol | Substrate/24 hour Breakaway Torque (N · m) | | | |
| --- | --- | --- | --- | --- |
| (Wt. %) | BO & MS | Brass | ZnDiCr | SS |
| 1 | 34.42 | 10.16 | 17.76 | 9.88 |
| 0.5 | 28.82 | 11.72 | 15.18 | 9.88 |
| 0.25 | 30.30 | 8.50 | 14.90 | 5.76 |
| 0.1 | 28.96 | 9.66 | 16.02 | 7.26 |
| 0.01 | 29.52 | 9.48 | 12.60 | 11.38 |
| 0 (Sample A) | 38.08 | 16.24 | 12.70 | 7.92 |

In Table 5 below, prevail torque measurements were captured for the samples noted in Table 4.

TABLE 5

| THBQol | Substrate/24 hour Prevail Torque (N · m) | | | |
| --- | --- | --- | --- | --- |
| (Wt. %) | BO & MS | Brass | ZnDiCr | SS |
| 1 | 45.40 | 29.46 | 26.40 | 9.88 |
| 0.5 | 47.74 | 35.26 | 26.16 | 25.24 |
| 0.25 | 44.12 | 36.36 | 23.76 | 26.42 |
| 0.1 | 45.00 | 37.90 | 20.48 | 32.42 |
| 0.01 | 37.24 | 27.96 | 22.38 | 22.38 |
| 0 (Sample A) | 45.68 | 40.26 | 23.88 | 32.48 |

Bearing in mind that Sample A uses THQ in an amount of 1 percent by weight, it is apparent from the data recorded in Tables 4 and 5 that the use of THBQol instead may produce at least acceptable performance in many cases at levels as low as 0.1 percent by weight. See also FIGS. 1 and 2 for a graphical depiction of this data.

One hour breakaway and prevail strength measurements for these samples were also captured and recorded below in Tables 6 and 7.

TABLE 6

| THBQol | Substrate/1 hour Breakaway Torque (N · m) | | | |
| --- | --- | --- | --- | --- |
| (Wt. %) | BO & MS | ZnDiCr | Brass | SS |
| 1 | 35.18 | 0.84 | 16.43 | 5.85 |
| 0.5 | 35.52 | 4.74 | 14.64 | 7.90 |
| 0.25 | 32.20 | 7.84 | 12.44 | 7.12 |
| 0.1 | 29.28 | 5.42 | 10.83 | 7.60 |
| 0.01 | 12.82 | 7.00 | 9.36 | 3.02 |
| 0 (Sample A) | 26.03 | 2.32 | 18.52 | 7.72 |

TABLE 7

| THBQol | Substrate/1 hour Prevail Torque (N · m) | | | |
| --- | --- | --- | --- | --- |
| (Wt. %) | BO & MS | Brass | SS | ZnDiCr |
| 1 | 45.00 | 36.88 | 29.65 | 0.50 |
| 0.5 | 41.32 | 32.92 | 30.08 | 14.62 |
| 0.25 | 35.48 | 31.82 | 25.92 | 15.80 |
| 0.1 | 33.82 | 31.14 | 29.10 | 15.76 |
| 0.01 | 17.46 | 30.92 | 12.06 | 17.26 |
| 0 (Sample A) | 36.18 | 33.50 | 27.32 | 2.44 |

Like the 24 hour breakaway and prevail data, it is apparent from the 1 hour breakaway and prevail data recorded in Tables 6 and 7 that the use of THBQol instead may produce at least acceptable performance in many cases at levels as low as 0.1 percent by weight. See also FIGS. 3 and 4 for a graphical depiction of this data.

24 hour cure performance of THBQol as a cure accelerator in an anaerobic curable composition five different amounts was also compared with Sample A (which had no THBQol, but rather 0.9 wt % THQ). The results are captured in Table 8 below.

TABLE 8

| 24 hour Cure, Mild Steel Pin and Collar | |
| --- | --- |
| THBQol (Wt. %) | Shear Strength (N · mm$^{-2}$) |
| 1 | 18.57 |
| 0.5 | 20.08 |

TABLE 8-continued 24 hour Cure, Mild Steel Pin and Collar

| THBQol (Wt. %) | Shear Strength (N · mm$^{-2}$) |
|---|---|
| 0.25 | 20.38 |
| 0.1 | 17.70 |
| 0.01 | 12.98 |
| 0 (Sample A) | 19.28 |

Anaerobic curable compositions with THBQol as an accelerator displayed excellent performance on mild steel pin and collars after 24 hour cure in amounts ranging from 0.1 to 1 percent by weight. See FIG. 5.

1 hour cure performance of THBQol as a cure accelerator in an anaerobic curable composition five different amounts was also compared with Sample A (which had no THBQol, but rather 0.9 wt % THQ). The results are captured in Table 9 below.

TABLE 9

1 hour Cure, Mild Steel Pin and Collar

| THBQol (Wt. %) | Shear Strength (N · mm$^{-2}$) |
|---|---|
| 1 | 18.25 |
| 0.5 | 20.53 |
| 0.25 | 20.46 |
| 0.1 | 17.93 |
| 0.01 | 16.12 |
| 0 (Sample A) | 21.28 |

Anaerobic curable compositions with THBQol as an accelerator displayed excellent performance on mild steel pin and collars after 1 hour cure in amounts ranging from 0.1 to 1 percent by weight. See FIG. 6.

Cure through gap performance of THBQol as a cure accelerator in an anaerobic curable composition wat two different amounts as also compared with Sample A (which had no THBQol, but rather 0.9 wt % THQ). The results are captured in Table 10 below.

TABLE 10

24 hour, 0.15 mm Gap Cure, Mild Steel Pin and Collar

| THBQol (Wt. %) | Shear Strength (N · mm$^{-2}$) |
|---|---|
| 1 | 3.13 |
| 0.1 | 3.93 |
| 0 (Sample A) | 3.08 |

Figure 7:
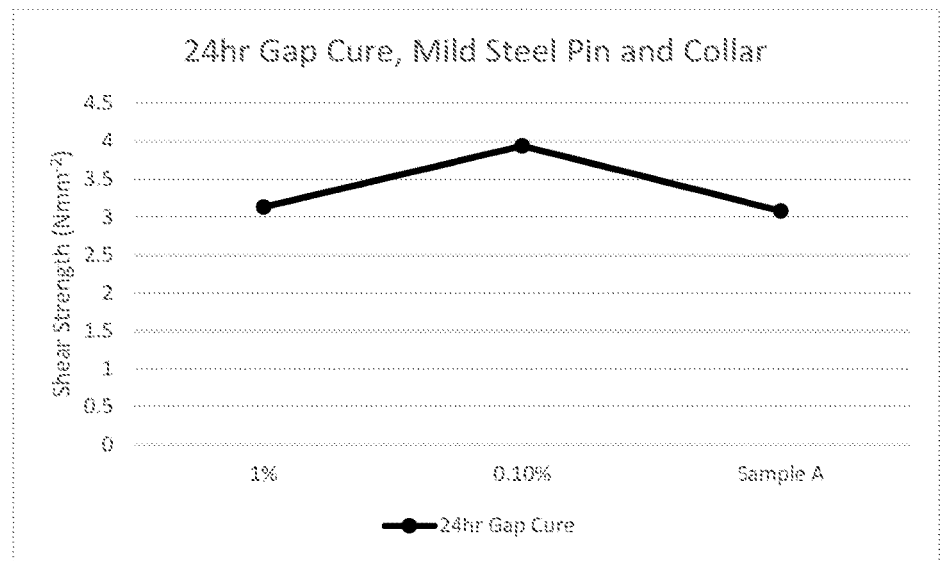
FIG. 7 depicts a plot of 24 hour shear strength of anaerobic adhesive compositions as a control (that contains 0.9% by weight THQ as an accelerator) and a comparable one without THQ but with THBQol as an inventive cure accelerator at various concentrations, on pin and collars constructed from mild steel set with a gap of 0.15 mmm between the pin and collar.

Anaerobic curable compositions with THBQol as an accelerator displayed excellent cure through gap performance on mild steel pin and collars at 0.15 mm gap after 24 hour cure in amounts ranging from 0.1 to 1 percent by weight. See FIG. 7.

THBQol was also compared with APH as a cure accelerator. Thus, instead of using Sample A as a control, Sample C was used as a control in the following evaluation, as it uses APH as a cure accelerator.

In Table 11, shear strength performance after 1 hour and 24 hours is captured for Samples C and D, as the average of five replicates on mild steel pin and collars having first been degreased.

TABLE 11

| | Sample | |
|---|---|---|
| Physical Property | C | D |
| Shear Strength/Pin and Collar, 1 hour | 11 | 11 |
| Shear Strength/Pin and Collar, 24 hours | 13 | 13 |

Figure 8:
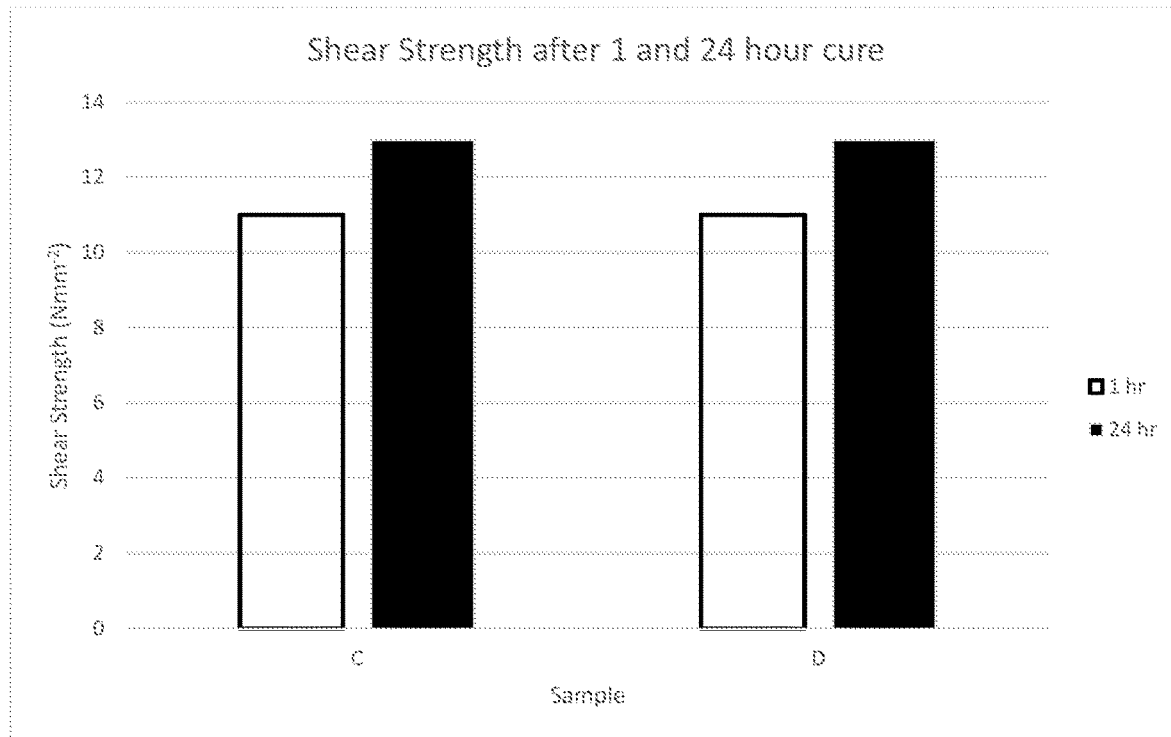
FIG. 8 depicts a bar chart of shear strength values for Samples C and D after 1 and 24 hour cure.

This data indicates that shear strength performance of THBQol as an accelerator is at least comparable to APH on bonded mild steel parts. See FIG. 8 for a graphical depiction of the data.

In Table 12, breakaway torque performance after 30 minutes and 24 hours is captured for Samples C and B, as the average of five replicates on black oxide nuts and bolts having first been degreased.

TABLE 12

| | Sample | |
|---|---|---|
| Physical Property | C | D |
| Breakaway Torque/M10 Black Oxide Nuts and Bolts, 30 minutes | 15 | 17 |
| Breakaway Torque/M10 Black Oxide Nuts and Bolts, 24 hours | 24 | 32 |

Figure 9:
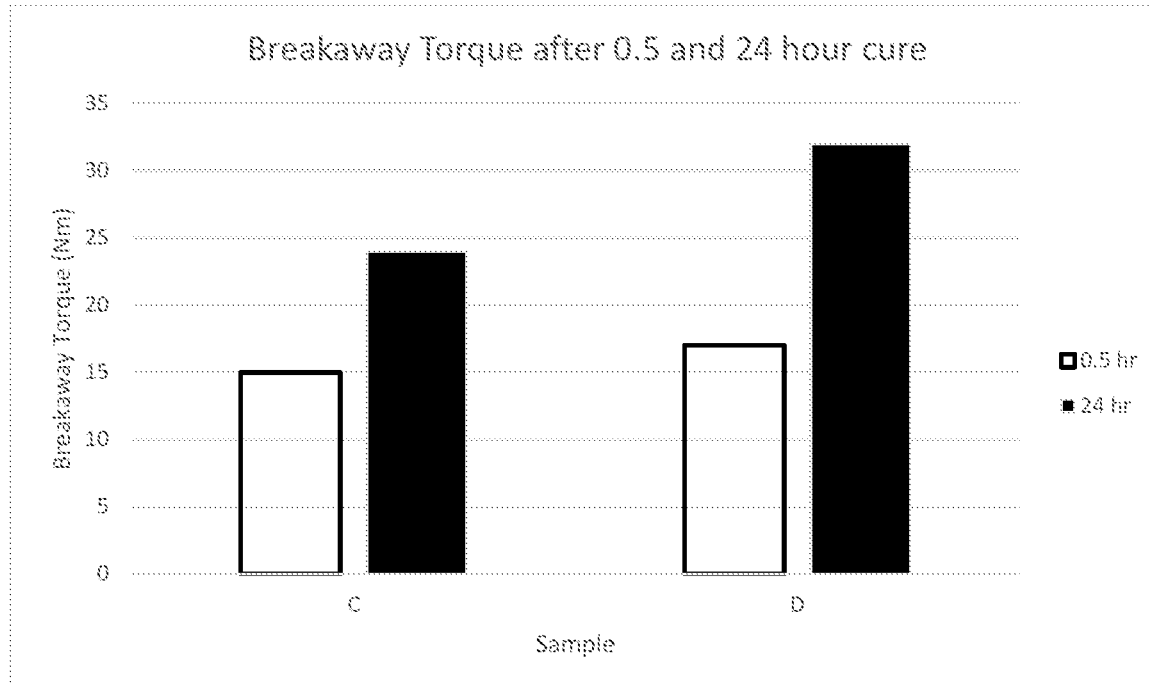
FIG. 9 depicts a bar chart of breakaway torque values for Samples C and D after 0.5 and 24 hour cure.

This data indicates that breakaway torque performance of THBQol as an accelerator is at least comparable to APH on bonded black oxide nuts and bolts. See FIG. 9 for a graphical depiction of the data.

In Table 13, prevail torque performance data is captured for Samples C and D, as the average of five replicates on black oxide nuts and bolts having first been degreased.

TABLE 13

| | Sample | |
|---|---|---|
| Physical Property | C | D |
| Prevail Torque/M10 Black Oxide Nuts and Bolts, 30 minutes | 1.6 | 2.3 |
| Prevail Torque/M10 Black Oxide Nuts and Bolts, 24 hours | 3.4 | 5.7 |

Figure 10:
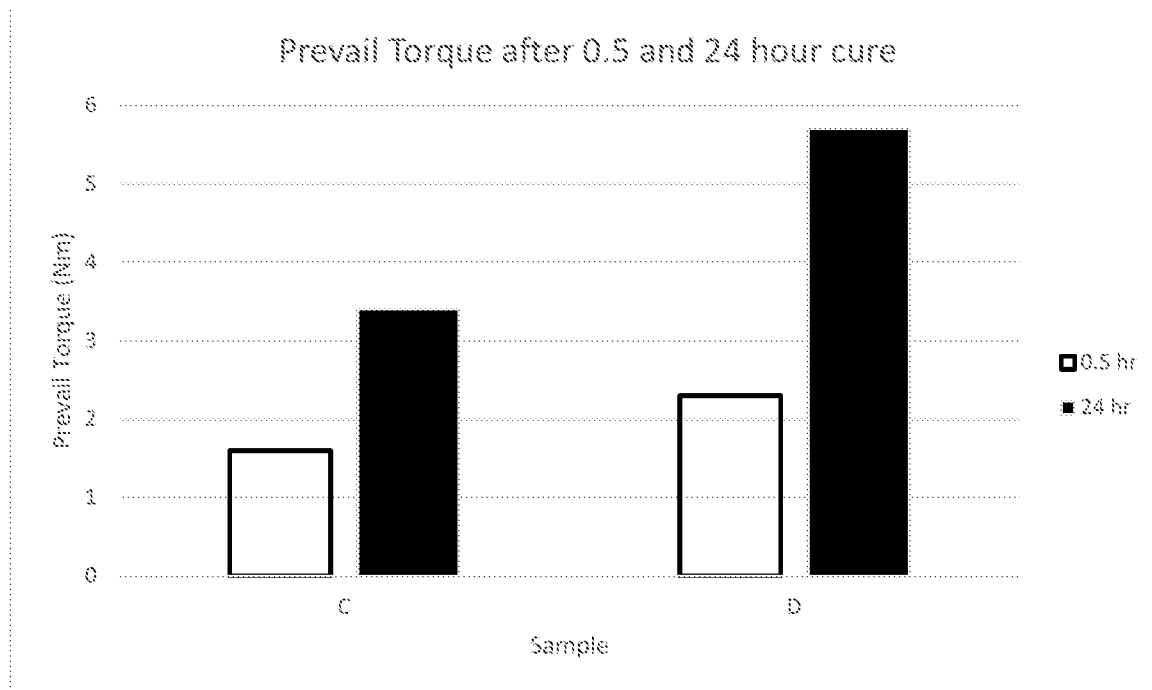
FIG. 10 depicts a bar chart of prevail torque values for Samples C and D after 1 and 24 hour cure.

This data indicates that breakaway torque performance of THBQol as an accelerator is at least comparable to APH on bonded black oxide nuts and bolts. See FIG. 10 for a graphical depiction of the data.

What is claimed is:

1. An anaerobic curable composition comprising:
   (a) a (meth)acrylate component;
   (b) an anaerobic cure-inducing composition; and
   (c) a cure accelerator embraced by

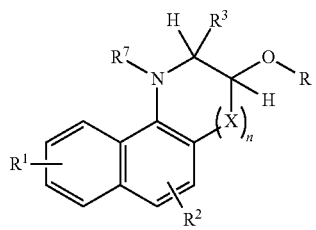

wherein X is CH$_2$, O, S, NR$^4$, CR$^5$R$^6$ or C═O, wherein R$^4$, R$^5$, and R$^6$ are each individually selected from hydrogen, halogen, amino, carboxyl, nitro, alkyl, alkenyl, alkynyl, hydroxyalkyl, hydroxyalkenyl, hydroxyalkynyl, or alkaryl; R is hydrogen, alkyl, alkenyl, alkynl, hydroxyalkyl, hydroxyalkenyl, or hydroxyalkynl; R$^1$, R$^2$, and R$^3$ are each individually selected from hydrogen, halogen, amino, carboxyl, nitro, alkyl, alkenyl, alkynyl, hydroxyalkyl, hydroxyalkenyl, hydroxyalkynyl, or alkaryl; R$^7$ is hydrogen or CHR$^8$R$^9$, wherein R$^8$ and R$^9$ are each individually selected from hydrogen, halogen, amino, carboxyl, nitro, alkyl, alkenyl, alkynyl, hydroxyalkyl, hydroxyalkenyl, hydroxyalkynyl, or alkaryl; and n is 0 or 1.

2. The composition according to claim 1, wherein the anaerobic cure-inducing composition comprises a hydroperoxide selected from the group consisting of t-butyl hydroperoxide, p-methane hydroperoxide, cumene hydroperoxide, diisopropylbenzene hydroperoxide, and mixtures thereof.

3. The composition according to claim 1, further comprising at least one co-accelerator.

4. The composition according to claim 3, wherein the co-accelerator is selected from the group consisting of amines, amine oxides, sulfonamides, metal sources, acids, and mixtures thereof.

5. The composition according to claim 3, wherein the co-accelerator is selected from the group consisting of triazines, ethanolamine, diethanolamine, triethanolamine, N,N dimethyl aniline, benzene sulphanimide, cyclohexyl amine, triethyl amine, butyl amine, saccharin, N,N-diethyl-p-toluidine, N,N-dimethyl-o-toluidine, acetyl phenylhydrazine, maleic acid, and mixtures thereof.

6. The composition according to claim 1, further comprising at least one stabilizer.

7. The composition according to claim 6, wherein the stabilizer is selected from the group consisting of benzoquinone, naphthoquinone, anthraquinone, hydroquinone, methoxyhydroquinone, butylated hydroxy toluene, ethylene diamine tetraacetic acid or a salt thereof, and mixtures thereof.

8. The composition according to claim 1, wherein the cure accelerator is

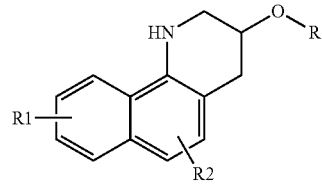

wherein R is hydrogen, alkyl, alkenyl, alkynl, hydroxyalkyl, hydroxyalkenyl, or hydroxyalkynl; and R$^1$ and R$^2$ are each individually selected from halogen, amino, carboxyl, nitro, alkyl, alkenyl, alkynyl, hydroxyalkyl, hydroxyalkenyl, hydroxyalkynyl, or alkaryl.

9. The composition according to claim 1, wherein the cure accelerator is selected from one or more of

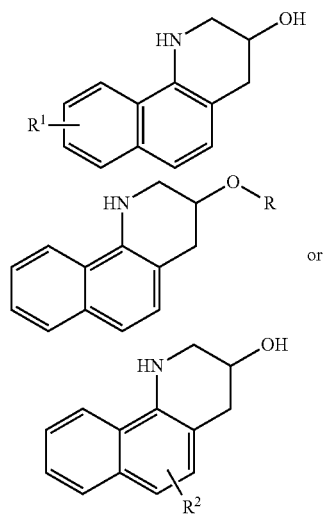

wherein R, R$^1$ and R$^2$ are as defined above.

10. The composition according to claim 1, wherein the cure accelerator is

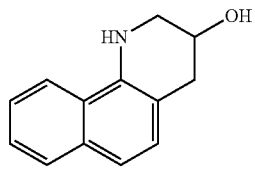 [SMILES: OC1CNc2c(ccc3ccccc23)C1]

1,2,3,4-tetrahydrobenzo-h-quinolin-3-ol.

* * * * *

UNITED STATES PATENT AND TRADEMARK OFFICE
CERTIFICATE OF CORRECTION

PATENT NO. : 11,274,190 B2
APPLICATION NO. : 16/844279
DATED : March 15, 2022
INVENTOR(S) : David Birkett et al.

It is certified that error appears in the above-identified patent and that said Letters Patent is hereby corrected as shown below:

In the Specification

Column 3, Line 44, change from "--$NH_2$--SH" to -- --$NH_2$ or --SH--.

Column 4, Line 67, change from "an accelerator" to --an accelerator)--.

Column 5, Line 7, change from "0.9% weight" to --0.9% by weight--.

Column 13, Line 12, change from "TABLE 23" to --TABLE 2B--.

Signed and Sealed this
Twenty-eighth Day of March, 2023

Katherine Kelly Vidal
*Director of the United States Patent and Trademark Office*